United States Patent
Cahill et al.

(10) Patent No.: US 10,972,360 B2
(45) Date of Patent: Apr. 6, 2021

(54) DYNAMIC DESIGN OF A LIGHTING CONFIGURATION

(71) Applicant: Lexi Devices, Inc., Berkeley, CA (US)

(72) Inventors: Scott Cahill, Berkeley, CA (US); Deepak Saxena, Andheri Mumbai (IN)

(73) Assignee: Lexi Devices, Inc., Berkeley, CA (US)

( * ) Notice: Subject to any disclaimer, the term of this patent is extended or adjusted under 35 U.S.C. 154(b) by 0 days.

(21) Appl. No.: 16/405,888

(22) Filed: May 7, 2019

(65) Prior Publication Data
US 2019/0349264 A1 Nov. 14, 2019

Related U.S. Application Data

(60) Provisional application No. 62/668,770, filed on May 8, 2018.

(51) Int. Cl.
*H04L 12/24* (2006.01)

(52) U.S. Cl.
CPC ............ *H04L 41/145* (2013.01); *H04L 41/20* (2013.01); *H04L 41/22* (2013.01)

(58) Field of Classification Search
CPC ...................................................... H04L 41/20
See application file for complete search history.

(56) References Cited

U.S. PATENT DOCUMENTS

| | | | |
|---|---|---|---|
| 8,296,669 B2 | 10/2012 | Madonna | G06F 3/00 |
| 8,890,435 B2 | 11/2014 | Bora | H05B 33/0845 |
| 9,055,627 B2 | 6/2015 | Madonna | H05B 37/0245 |
| 9,674,931 B1 | 6/2017 | Chen | H05B 37/0272 |
| 10,146,398 B2 | 12/2018 | Madonna | G06F 3/04815 |
| 2014/0181704 A1 | 6/2014 | Madonna | G06F 3/04817 |
| 2015/0310664 A1* | 10/2015 | Boussard | H04N 13/275 345/633 |

(Continued)

FOREIGN PATENT DOCUMENTS

| | | | |
|---|---|---|---|
| WO | WO2018046710 | 3/2018 | H05B 37/029 |
| WO | WO2018127378 | 7/2018 | H05B 37/0245 |

OTHER PUBLICATIONS

How to Set Up Your Philips Hue Lights (Year: 2018).*
Hue Hello—For Philips Hue Lights—Medium (Year: 2017).*

*Primary Examiner* — David E Choi
(74) *Attorney, Agent, or Firm* — Steven Stupp

(57) ABSTRACT

During operation, an electronic device receives a digital representation of an environment. Then, the electronic device receives input information that specifies a number of lighting devices, types of lighting devices or both. In response, the electronic device provides the input information to a second electronic device. Next, the electronic device receives from the second electronic device design information specifying one or more predefined lighting configurations suitable for use in the environment and that are compatible with the input information. Moreover, the electronic device presents the design information specifying the one or more predefined lighting configurations. Furthermore, the electronic device receives a user selection of a given predefined lighting configuration in the one or more predefined lighting configurations. In response to the user selection, the electronic device presents the one or more second images having associated perspectives that illustrate the given predefined lighting configuration in a context of the digital representation.

20 Claims, 17 Drawing Sheets

(56) References Cited

U.S. PATENT DOCUMENTS

| | | | |
|---|---|---|---|
| 2016/0338170 A1 | 11/2016 | Lebel | H05B 33/0857 |
| 2016/0360598 A1 | 12/2016 | Negatu | H05B 37/0272 |
| 2017/0097621 A1* | 4/2017 | Ackmann | G05B 15/02 |
| 2018/0302970 A1 | 10/2018 | Chen | H05B 33/0863 |
| 2019/0349264 A1* | 11/2019 | Cahill | H04L 12/2809 |

* cited by examiner

DYNAMIC DESIGN OF A LIGHTING CONFIGURATION

CROSS REFERENCE TO RELATED APPLICATIONS

This application claims priority under 35 U.S.C. 119(e) to U.S. Provisional Application Ser. No. 62/668,770, "Smart Lighting and Sensing Platform," by Scott Cahill, filed on May 8, 2018, the contents of which are herein incorporated by reference.

BACKGROUND

Field

The described embodiments relate to lighting and sensing systems. Notably, the described embodiments relate to physical light features and software for controlling these systems and light features.

Related Art

Trends in connectivity and in portable electronic devices are resulting in dramatic changes in people's lives. For example, increasingly powerful computing and communication capabilities of being included in electronic devices that are located throughout people's homes. In turn, these capabilities can enable the so-called 'Internet of things,' in which background electronic devices can communicate with each other and can access information to enable a wide variety of functions and services.

Much of the attention in the Internet of things has focused on adding such intelligence and communication capabilities in electronic door locks and smart thermostats. However, the typical home often only has a small number of instances of these devices at particular locations in the home. On the other hand, there are usually at least dozens of lights located through a home. In principle, adding computing and communication capabilities to lights (which is sometimes referred to as a 'smart light') offers the prospect of a significant and pervasive impact on users in environments throughout the home.

In practice, it has proven difficult to achieve these goals. Notably, it is often difficult to integrate and control many existing lights. Many existing lighting platforms or systems have limited functionality with user-interfaces that are cumbersome and time-consuming to use. These problems degrade the user experience, increase user frustration and limit adoption of smart lighting and associated systems.

BRIEF DESCRIPTION OF THE DRAWINGS

References are made to the accompanying drawings, which form a part of the description and in which are shown, by way of illustration, specific embodiments of the present disclosure.

Note that like reference numerals refer to corresponding parts throughout the drawings. Moreover, multiple instances of the same part are designated by a common prefix separated from an instance number by a dash.

DETAILED DESCRIPTION OF THE INVENTION

Example embodiments of a lighting system for creating light art and performing other functions with light (which is sometimes referred to as 'Lexi') are described. These examples and embodiments are provided solely to add context and aid in the understanding of the embodiments. Thus, it will be apparent to one skilled in the art that the present disclosure may be practiced without some or all of the specific details described herein. In other instances, well-known concepts have not been described in detail in order to avoid unnecessarily obscuring the embodiments. Other applications and examples are possible, such that the following examples, illustrations, and contexts should not be taken as definitive or limiting either in scope or setting. Although these embodiments are described in sufficient detail to enable one skilled in the art to practice the embodiments, these examples, illustrations, and contexts are not limiting, and other embodiments may be used and changes may be made without departing from the spirit and scope of the embodiments.

The disclosed embodiments provide a dynamic and flexible user interface and system for designing and controlled lights (such as light emitting diodes or LEDs). The lighting system or platform (which is sometimes referred to as the 'Lexi system' or the 'Lexi platform') is user friendly and allows users to efficiently (i.e., with reduced time, effort and/or expense) create customized lighting configurations and light patterns for particular environments (such as a room) and/or to identify predefined lighting configurations and light patterns for use in these environments.

Moreover, the lighting system may be used to create light-oriented art (which is sometimes referred to as 'smart light art'). In light-oriented art, the spatial and temporal light patterns created using the lights may be characterized as having both a functional (such as illumination or creation of a particular mood or emotional response in a viewer), as well as artistic application. The lighting system may allow the light-oriented art to flexibly created or design, and may allow the locations of the lights in a room or environment to be arbitrary and/or to be dynamically changed or adapted (as opposed to requiring the use of lights at known, fixed locations or positions).

Lighting System

Figure 1:
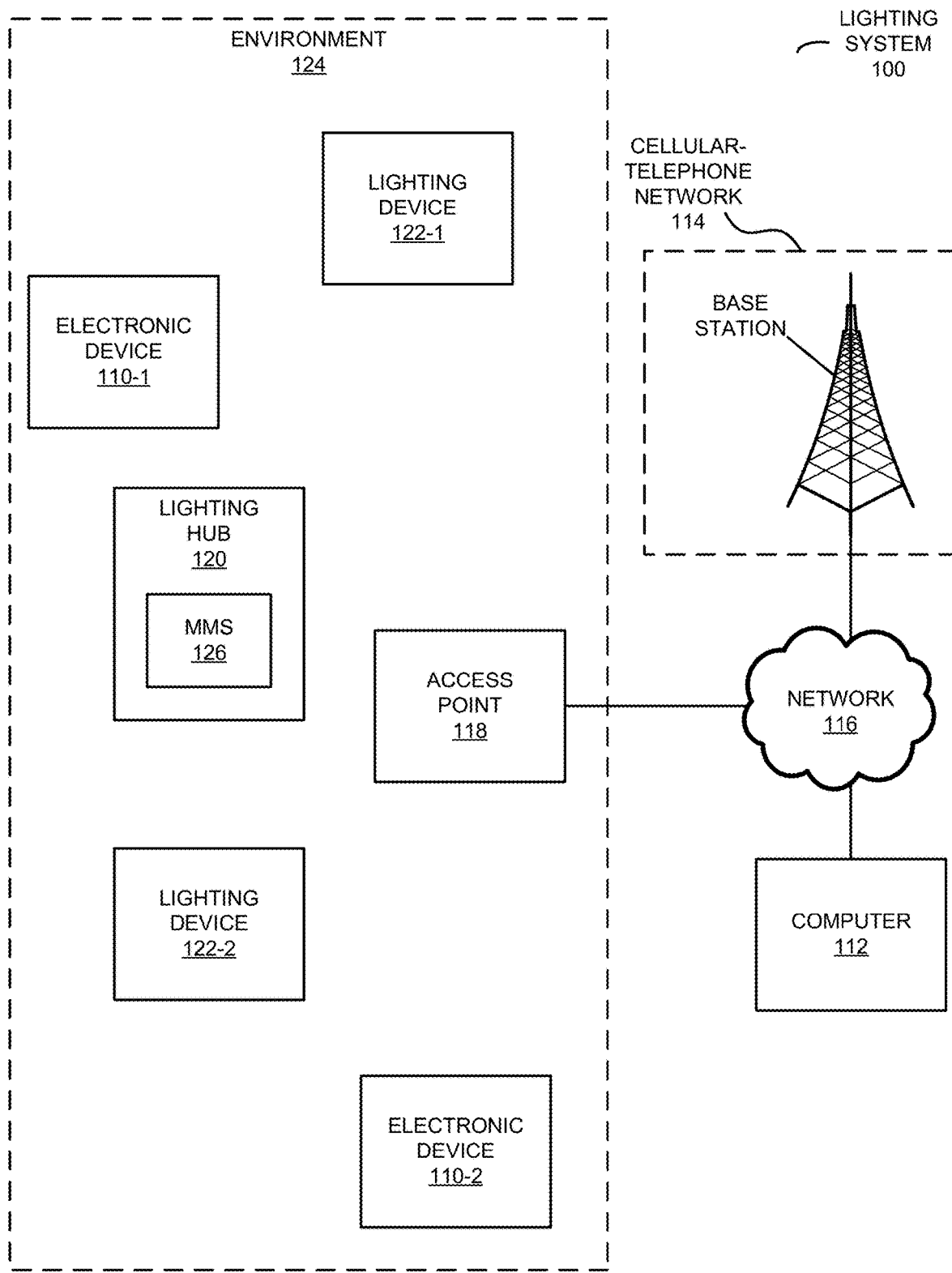
FIG. 1 is a drawing illustrating an example of a lighting platform in accordance with an embodiment of the present disclosure.

FIG. 1 presents a drawing illustrating an example of a lighting system 100. During operation, a mobile application or app executing on electronic device 110-1 (such as a cellular telephone) may be used for command and configuration of lighting system 100. Notably, a user may create an account using the mobile app or a cloud application, which is hosted on computer 112, and which can be accessed via a cellular-telephone network 114 and a network 116 (such as the Internet) or via an access point 118 and network 116. Once the account has been created, a user can sign in to lighting system 100. Note that lighting system 100 may include a lighting hub 120 and one or more lighting devices 122. Other components shown in FIG. 1 may be excluded or may not be included in lighting system 100.

Initial Hub Configuration

Initially, lighting hub 120 (which may function as an access point for lighting devices 122 in lighting system 100) for use in an environment 124 (such as a room or a building) may need to be configured (except in a mode without lighting hub 120 described below). For example, a user may turn on lighting hub 120 and lighting hub 120 may determine that it does not have an Internet Protocol (IP) address. Consequently, lighting hub 120 may automatically start in an 'access point' mode. The mobile app can then be used to connect to lighting hub 120 (e.g., via cellular-telephone network 114 and network 116 or access point 118 and network 116) and may instruct it to start a secondary Bluetooth or Bluetooth Low Energy (BLE) interface. The mobile app may then connect to the Bluetooth or BLE interface as well and may use it to send a Wi-Fi configuration to lighting hub 120. After connecting, via access point 116, to a Wi-Fi system configured by a user (such as a wireless local area network or WLAN), lighting hub 120 may send the IP address of lighting hub 120 to the mobile app. In this way, the mobile app may be able to communicate with lighting hub 120 using the IP address.

Device Configuration

Once lighting hub 120 has been configured, one or more lighting devices 122 (such as smart lights) can be configured. Lighting system 100 may support a variety of lights, such as standard light bulbs, LEDs, non-standard lights, e.g., down lights, strip lights, string lights, etc. In addition, lighting system 100 may include sensors (including a micro multi-sensor or MMS 126 in lighting hub 120) that perform measurements in environment 124 (such as sound, brightness, light color, a number of individuals in environment 124, locations of these users in environment 124, information that, in conjunction with a machine-learning technique, e.g., a classifier or a neural network, specifies a user's emotions or emotional state, etc.). Lighting system 100 may also be able to leverage measurements performed by one or more sensors in electronic device 110-1 (such as sound, voice-recognition inputs or commands, acceleration, etc.), and may be able to leverage/analyze other information provided, directly or indirectly, by electronic device 110-1 (such as time of day, occurrence of events based at least in part on a user's schedule or calendar, messages associated with a user, e.g., SMS messages or emails, social media posts, etc.). Lighting hub 120 may use such inputs from MMS 126 and/or electronic device 110-1 to control lighting devices 122 (such as which lighting devices 122 are turned on or off, setting the brightness of lighting devices 122, setting the color of lighting devices 122, creating temporal and/or spatial patterns of light, etc.).

In general, lighting devices 122 may include BLE mesh chipsets and may use this as their primary communication protocol. In some embodiments, lighting devices 122 may include a 900 MHz radio chipset. More generally, the components in lighting system 100 may use or support a wide variety of communication protocols, including: Bluetooth (from the Bluetooth Special Interest Group of Kirkland, Wash.), BLE, an Institute of Electrical and Electronics Engineers (IEEE) 802.11 standard (which is sometimes referred to as 'Wi-Fi,' from the Wi-Fi Alliance of Austin, Tex.), a 900 MHz communication protocol, Long Term Evolution (LTE), another cellular-telephone communication protocol, and/or another type of wireless interface.

In some embodiments, BLE mesh pairing may be initiated by the mobile app. For example, the mobile app may scan for available lighting devices 122 and may show the user a list of BLE-mesh lighting devices in lighting devices 122. The user can then select to pair with a lighting device (such as lighting device 122-1). Once the pairing is complete, the mobile app may send the information about lighting device 122-1 to lighting hub 120, so that lighting hub 120 can then control lighting device 120-1. Once lighting hub 120 and the one or more lighting devices 122 have been setup/configured, the user can start using lighting system 100.

Lighting Device Functionality

In some embodiments, functions of a lighting device (such as lighting device 122-1) may include: turn on/turn off, set brightness, set color temperature (for white), and/or set color (for a color space, such as RGB). The rest of the functionality in lighting system 100 may be controlled via the software executed by lighting hub 100 and/or a cloud-based computer 122 that can be accessed via a network 116 (such as the Internet) using a communication protocol (such as Ethernet). However, in general, different embodiments may implement the functionality and control of the functionality in lighting hub 120, lighting devices 122, or both, and the functionality and the control of functionality may be implemented in hardware and/or software, as is known to one of skill in the art. This software may support the ability to set the functions of lighting devices 122 on an individual lighting-device basis, as well as in user-defined groups of lighting devices 122 or universally. Users can also create schedules, rules, scenes and/or light shows which dynamically adjust these settings.

Multiple System Control

Because a user can have more than one lighting system, the mobile app may support multiple lighting hubs in the same or different environments. For example: if the user has one lighting system at home and another one in the office, the user may select a switch lighting hub option from a menu in a user interface to select the appropriate lighting hub. As soon as user does this, the mobile app may load the lighting-device information and configuration for that particular lighting hub and user can then use that particular lighting system.

Multiple User Control

Lighting system 100 may also support multiple users controlling a single lighting hub 120. For example, if a husband and a wife can both use their home lighting system 100 from their individual electronic devices 110. A first user who configured lighting hub 120 may click or activate a "share hub" option from the mobile app menu. A unique code may then be generated for lighting hub 120. This code can be shared with the user who needs access to this lighting hub 120. A second user can then initiate the process of adding a hub and may select a claim hub option. This user may be asked to enter an access code, after which that user may be added as one of the users of lighting hub 120 and then can control lighting hub 120.

Cloud App

In some embodiments, lighting system 100 may be configured and controlled via a desktop app running in the cloud, e.g., on computer 112. Users may use the same username and password from the mobile app to sign into the desktop app. The desktop app may provide users the ability to: manage their lighting devices 122, view reports summarizing use, patterns and energy consumption of their lights devices 122 and/or sensors, upload, sell and manage their light art, purchase light art and manage those purchases, and/or share their light art and manage the individuals with whom they share their light art. Note that the user(s) actions performed in the mobile app may be captured by lighting hub 120 and then provided to computer 112, so that the configuration and state of lighting devices 122 in the mobile app and the desktop app are synchronized.

Device Grouping

Lighting system 100 may allow lighting devices 122 to be grouped. Once grouped, multiple lighting devices 120 can be controlled together. The functions of the group may include: group turn on/group turn off, change group color, change group brightness and change group color temperature. Note that a defined group may also be used in advance concepts, such as a rule that can be applied to a group of lighting devices 122.

Favorites

In some embodiments, a user can set scenes or temporal and/or spatial patterns for one or more lighting devices 122 or groups as favorites and then can run them by activating a single icon in the mobile app and/or the desktop app.

Schedules & Rules

In some embodiments, a user can create own their schedules that can then be used to create one or more rules. Moreover, lighting system 100 may support rules based on IFTTT (IF This Then That). A rule may have three parts: a trigger, an activity and associated output lighting device(s). A trigger may be a schedule, a sensor input, an event (e.g., a voice call or a message), etc. Furthermore, a rule may be initiated upon occurrence of a trigger. The activity may be an action that will be performed in case of the rule trigger. An activity can include: turn on/off, changing brightness, changing color temperature and/or color or initiating a scene or a light show (which, in general, may involve a temporal and/or a spatial pattern of lighting). Additional, the output lighting device(s) can be one or more lighting devices 122 or a group. Note that a rule can also be a complex set of conditions. For example, a user can create a rule to turn on/off lighting devices 122 based on input from one or more sensors (such as a light sensor). The user can also create rules based on a schedule (such as different lighting in the evening vs. the day time).

In order to perform these functions, a user may need to activate a particular rule after it has been created. Note that entities that are part of an active rule may not be deleted.

Light Art

In some embodiments, a 'scene' may include one or more colors that spatially and/or temporally operate across a group of lighting devices 122. Scenes with multiple colors may be defined by selecting the colors in order of their appearance, transition times between colors and a length of time of each color. A user may also define the number of cycles for the scene and also the end color (e.g., the duration of a given cycle). Lighting system 100 may also provide a number of predefined scenes. A user may also modify predefined scenes and save them for subsequent use. A scene may also be imported from an external file. Moreover, a user may preview a scene and/or play/stop a scene. The scene may be played on one or more lighting devices 122 and/or in a group.

Note that a 'pattern' may be a temporal and/or spatial pattern of light that moves across a single lighting device that incorporates more than one light source, such that different light sources on the lighting device show different colors at the same time. Lighting system 100 may provide predefined patterns, as well as the ability to allow a user to create their own patterns using the mobile app. A user can also modify predefined patterns and save them as original creations for subsequent use. Moreover, there can be different kinds of patterns. For example, a user can draw the pattern using a user interface. Alternatively or additionally, the user can enter text to create a pattern or may upload an image and have that converted to a pattern. Then, the user can select the duration to run the pattern in lighting system 100. For the text that specifies a pattern, a user can select how the text appears on the output lighting device and how/when it goes away.

Moreover, a 'light show' may include patterns that run across multiple lighting devices 122 at the same time. Lighting system 100 may support the ability to run multiple light shows simultaneously across different groups of lighting devices 122. Lighting system 100 may also provide predefined light shows. A user can also create their own light shows using the mobile app and/or the desktop app.

Furthermore, a user may use a user interface provided by computer 112 to design or specify settings, configurations, rules, patterns and/or light shows. Note that a 'setting' may simultaneously specify different groups, types or categories of lighting devices 112 in different configurations. Additionally, a 'configuration' may include turn on/off, brightness, color, color temperature, a rule that specifies a trigger, action and light configuration, a scene, a pattern and/or a light show. Settings may be specific to a particular room or an entire home, restaurant, bar or hotel (and, more generally, an environment 124). In some embodiments, settings may be nested so that a configuration may be another setting. In this way, entire buildings can be set up and saved as a setting room-by-room or section by section.

Creating Light Art

Lighting system 100 provides several ways to create light art.

Scene creation may be used to: create scenes, select colors from a color wheel in priority order, designate the total duration of the scene, a transition style and/or the number of cycles to run the scene. In another technique (which is sometimes referred to as 'color path'), a user can draw a path through a color wheel to designate a desired sequence of colors. Then, the user may select the duration and number of cycles.

A light show may be used to specify patterns run across multiple lighting devices 122 simultaneously. In general, a light show may be three-dimensional (3D). In order to properly run a light show, the spatial position or location of each lighting device may need to known relative to the other lighting devices 122 in (x,y,z) space. In general, the technique(s) used to determine the spatial position of each lighting device may depend upon whether the lighting device is located indoors or outdoors.

Figure 2:
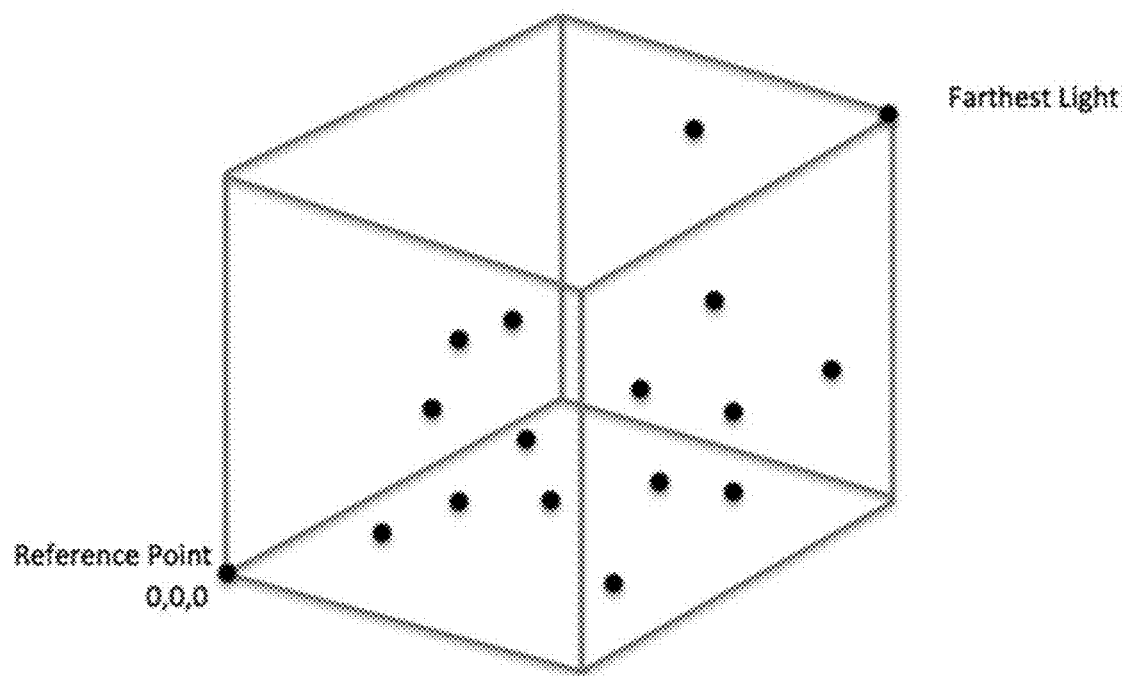
FIG. 2 is a drawing illustrating an example of a three-dimensional (3D) cube with relative coordinates of lights in an (x,y,z) space in accordance with an embodiment of the present disclosure.
Figure 3:
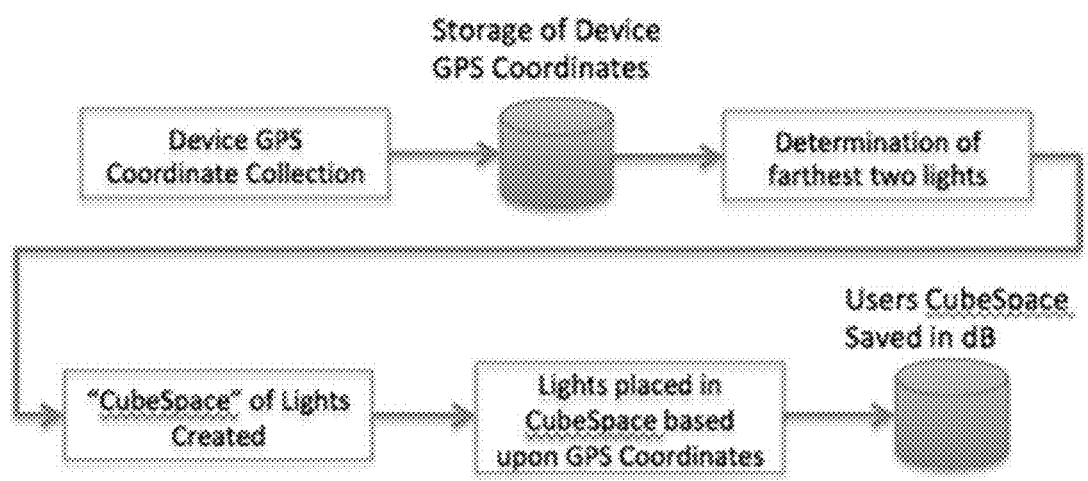
FIG. 3 is a drawing illustrating an example of a workflow for creating a 3D cube space in an outdoor environment using a positioning system in accordance with an embodiment of the present disclosure.

For an outdoor deployment, lighting devices 122 may include a global positioning system (GPS) chip, so lighting system 100 may collect the GPS coordinates of each lighting device 122. GPS may provide absolute coordinates of lighting devices 122 in (x,y,z) space within the margin of error of GPS. Each GPS coordinate may be stored in a data structure (e.g., by computer 112). Then, a 3D cube may be defined around lighting devices 122. In order to create the 3D cube, the distance between two most widely separated lighting devices 122 may be determined and then triangulation or trilateration may be used to create an initial reference point at (0,0,0). This reference point may be assigned its own GPS coordinates and then the other lighting devices 122 may be placed in the 3D cube based upon their GPS coordinates. FIG. 2 present a drawing illustrating an example of a 3D cube with relative coordinates of lights in an (x,y,z) space. Moreover, FIG. 3 presents a drawing illustrating an example of a workflow for creating a 3D arrangement of lights (which is sometimes referred to as a 'cube space') in an outdoor environment using a positioning system.

Figure 4:
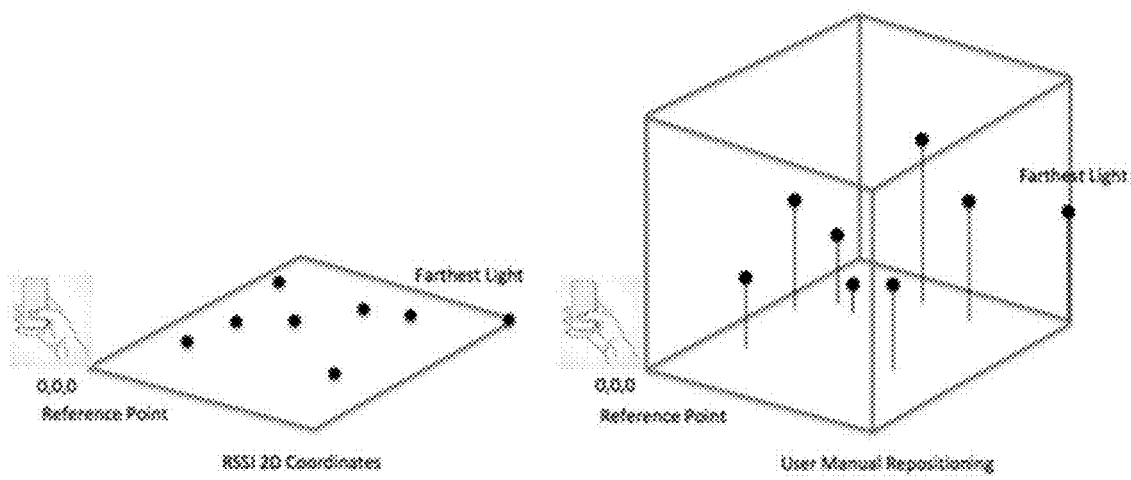
FIG. 4 is a drawing illustrating an example of a process for converting a two-dimensional (2D) map of a user's lights to a 3D cube space in accordance with an embodiment of the present disclosure.
Figure 5:
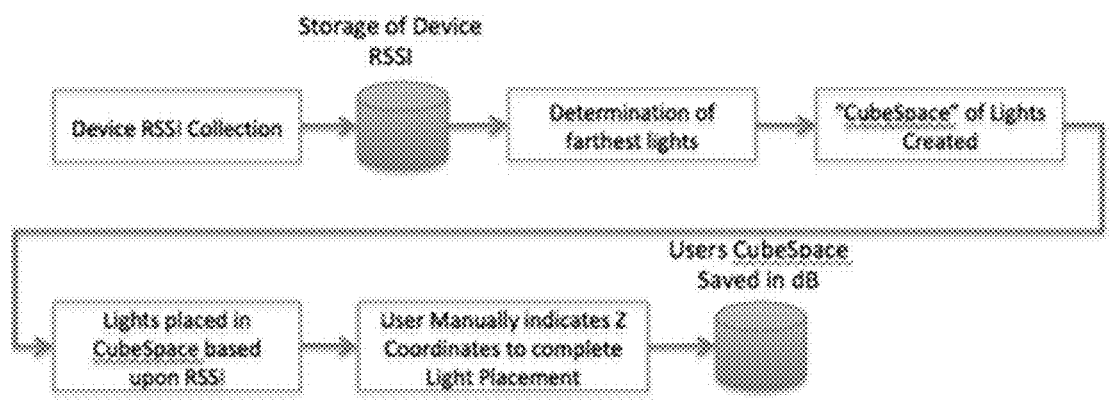
FIG. 5 is a drawing illustrating an example of a workflow for creating a 3D cube space in an indoor environment based on a received signal strength indicator (RSSI) in accordance with an embodiment of the present disclosure.

For an indoor deployment, a measured received signal strength indicator (RSSI) may be used to determine the position of each lighting device 122 relative to a reference point. For example, a reference point may be defined by electronic device 110-1 while it is at a constant position and while it scans the signals from lighting devices 122 using BLE. Each received signal may be recorded in a data structure as an (x, y) coordinate relative to the reference point. Once lighting devices 122 have been scanned, a cube in 3D space can be constructed. The length of a side of this cube may be determined by triangulation or trilateration based upon the distance between the most distant lighting device and the reference point. Moreover, based on the (x, y) coordinates of lighting devices 122 in relation to the reference point, the position of each of lighting devices 122 may be mapped in this 3D space. Note that, because RSSI may provide two-dimensional (2D) information, a user may then create or define the z coordinate of each of lighting devices 122 by dragging them into desired z positions inside the cube using a user interface to complete the 3D positioning of lighting devices 122. FIG. 4 presents a drawing illustrating an example of a process for converting a 2D map of a user's lights to a 3D cube space. Furthermore, FIG. 5 presents a drawing illustrating an example of a workflow for creating a 3D cube space in an indoor environment based on RSSI.

While the preceding discussion illustrated particular techniques for determining the absolute or relative positions of lighting devices 122, in other some embodiments the positions may be determined using: a local positioning system, a global positioning system, wireless ranging, wireless signals, triangulation and/or trilateration. Furthermore, in some embodiments an image-processing technique may be used to determine the locations of lights or lighting devices 122 in an image of the environment (such as, e.g., indoors and/or outside). For example, the image-processing technique may include: scale invariant feature transform (SIFT), speed-up robust features (SURF), a binary descriptor (such as ORB), binary robust invariant scalable keypoints (BRISK), fast retinal keypoint (FREAK), etc. In some embodiments, the image-processing technique may be implemented using a neural network and/or a machine-learning technique, such as a convolutional neural network.

Figure 6:
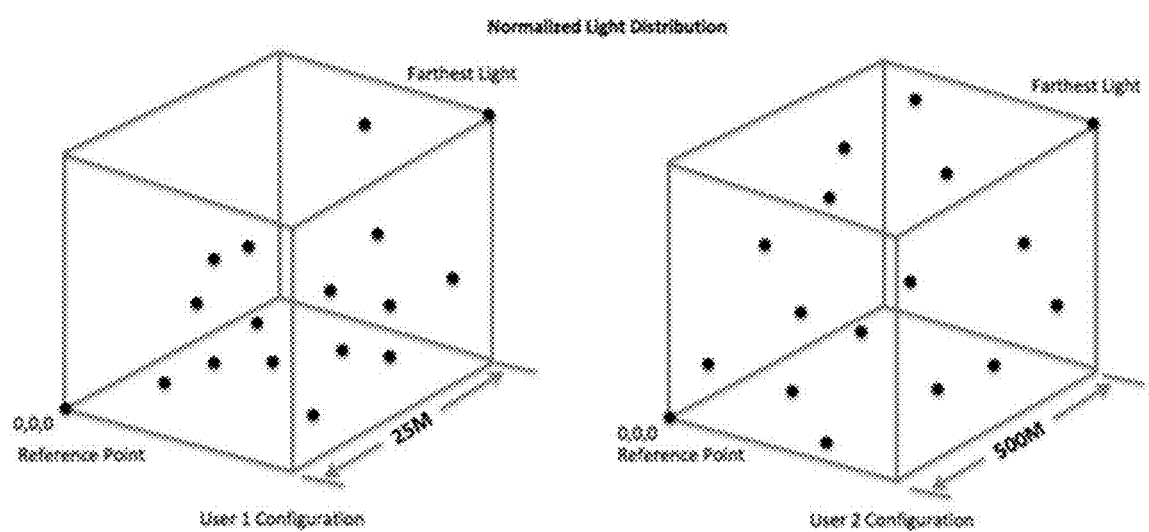
FIG. 6 is a drawing illustrating an example of how creating a 3D space that encompasses a user's lights normalizes the lights regardless of distance into a cube space in accordance with an embodiment of the present disclosure.
Figure 7:
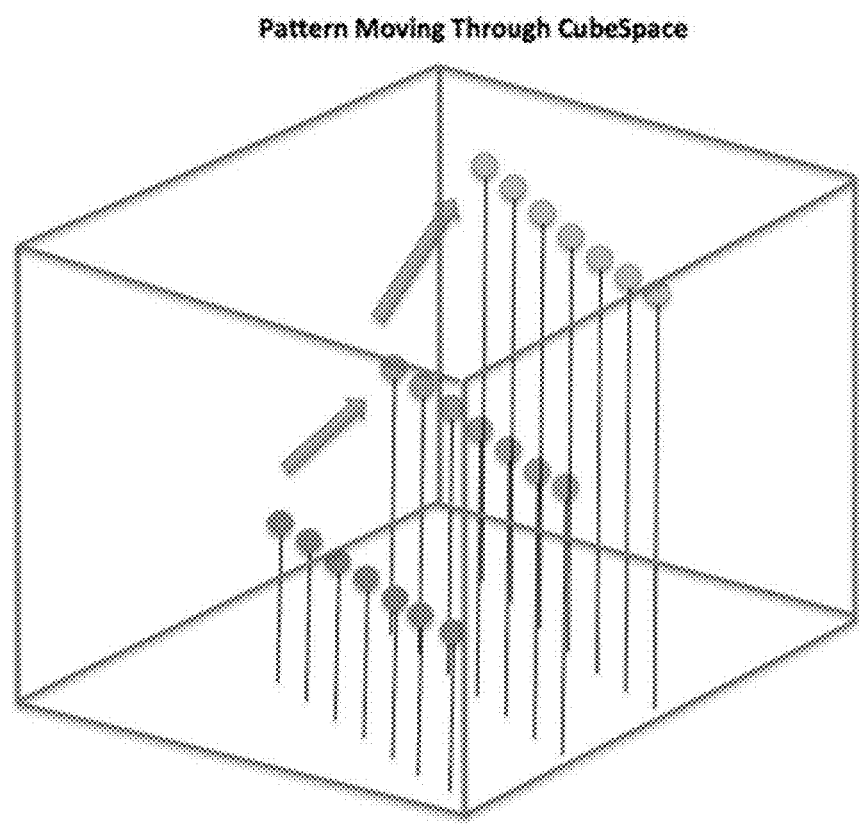
FIG. 7 is a drawing illustrating an example of movement of a light pattern in cube space in accordance with an embodiment of the present disclosure.

Moreover, while the absolute size of a cube may be defined or specified by a user, in order to create a light show the relative position of each lighting device within the cube may be needed. Because a 3D space, no matter how large or small, can be represented within a cube, note that placing each user's lighting configuration into a cube may normalizes it in the sense that lighting system 100 may store and use different users' configurations via the same construct. FIG. 6 presents a drawing illustrating an example of how creating a 3D space that encompasses a user's lights normalizes the lights regardless of distance into a cube space Once defined, the normalized cube space may be mapped to light-show creation software, so that different light shows can be created in a cube space. Moreover, using the light-show creation software, artists may create patterns that move through a 3D cube. For example, these patterns can be constructed to move solely in a horizontal or vertical fashion or can be designed in order to simulate an arbitrary manner of movement. However, the patterns may be defined within the construct of a cube, even if they do not move throughout the entirety of the cube but only take up a limited space or shape within the cube. FIG. 7 presents a drawing illustrating an example of movement of a light pattern in cube space.

Figure 8:
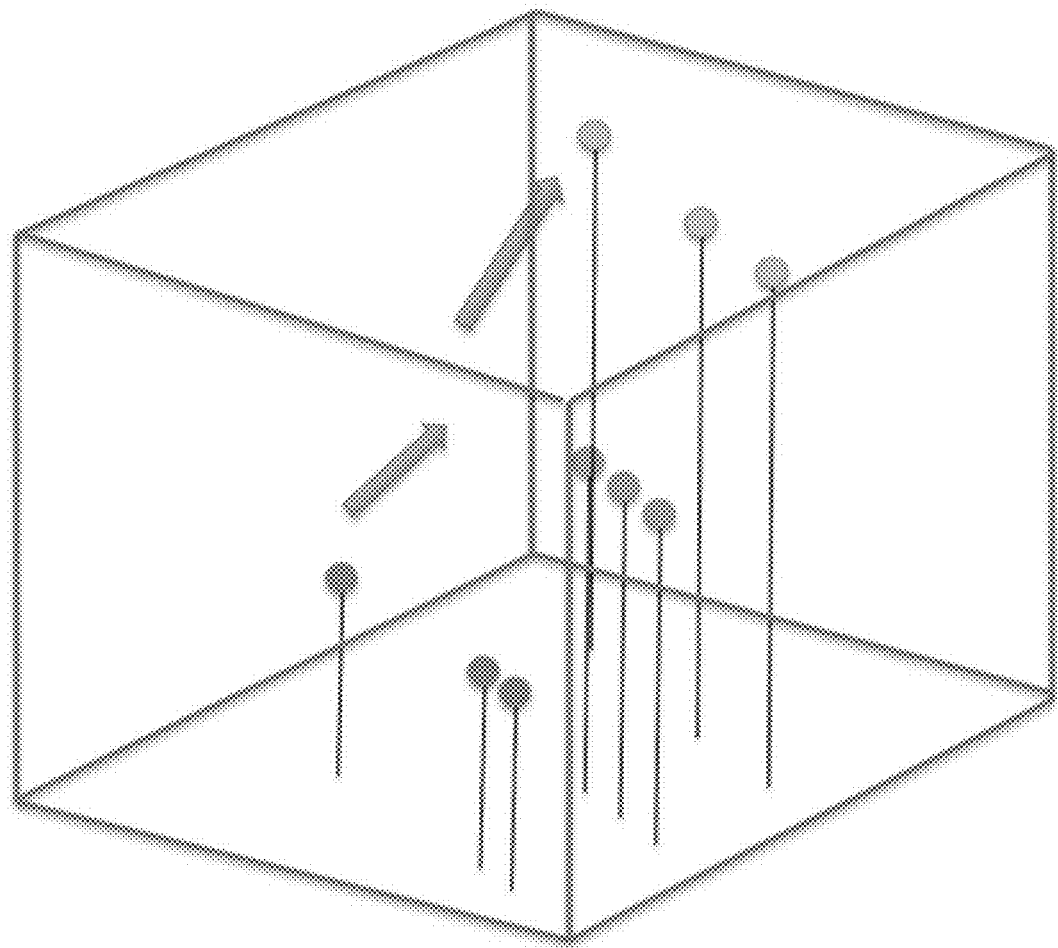
FIG. 8 is a drawing illustrating an example of movement of the light pattern in FIG. 7 across a user's light configuration in accordance with an embodiment of the present disclosure.
Figure 9:
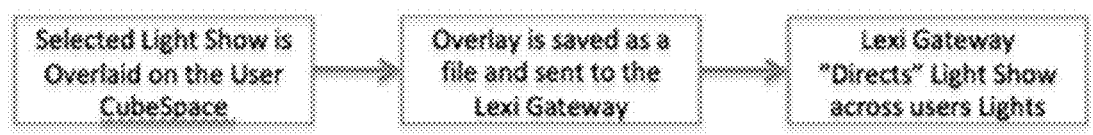
FIG. 9 is a drawing illustrating an example of a workflow for applying a 3D light show onto a 3D map of a user's lights in cube space in accordance with an embodiment of the present disclosure.

In order to present a light show on a particular light configuration of a user, the cube of the light show may be overlaid or superimposed on the light-configuration cube of the user. As the pattern within the light show 'encounters' lighting devices 122 in the user's configuration, the statistics of the light show at that (x,y,z) point in the cube space may be transmitted by lighting hub 120 to lighting devices 122 using wireless communication at a frame rate specified for lighting devices 122. Note that the data of the light show may include: brightness, color temperature or color of that (x,y,z) point. Moreover, the frame rate may include a refresh rate or transmission per second. FIG. 8 presents a drawing illustrating an example of movement of the light pattern in FIG. 7 across a user's light configuration. Furthermore, FIG. 9 presents a drawing illustrating an example of a workflow for applying a 3D light show onto a 3D map of a user's lights in cube space.

Gesture Creation of Light Art

Figure 10:
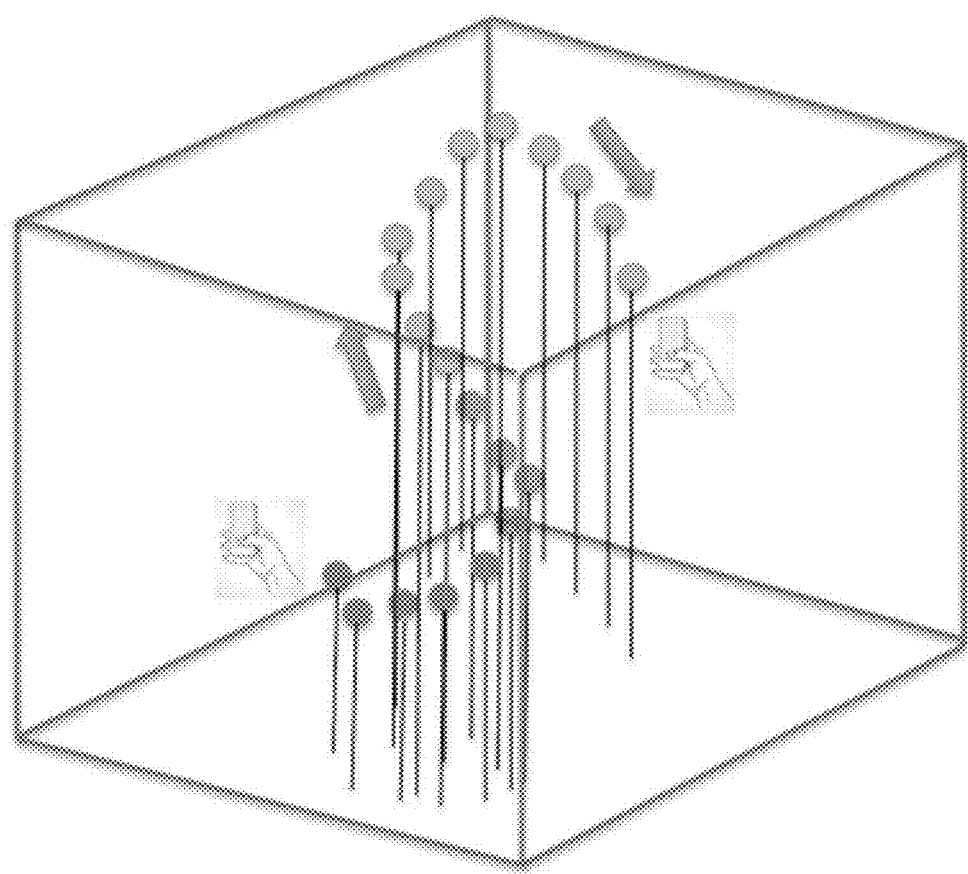
FIG. 10 is a drawing illustrating an example of the use of a portable electronic device to create a 3D pattern in cube space in accordance with an embodiment of the present disclosure.
Figure 11:
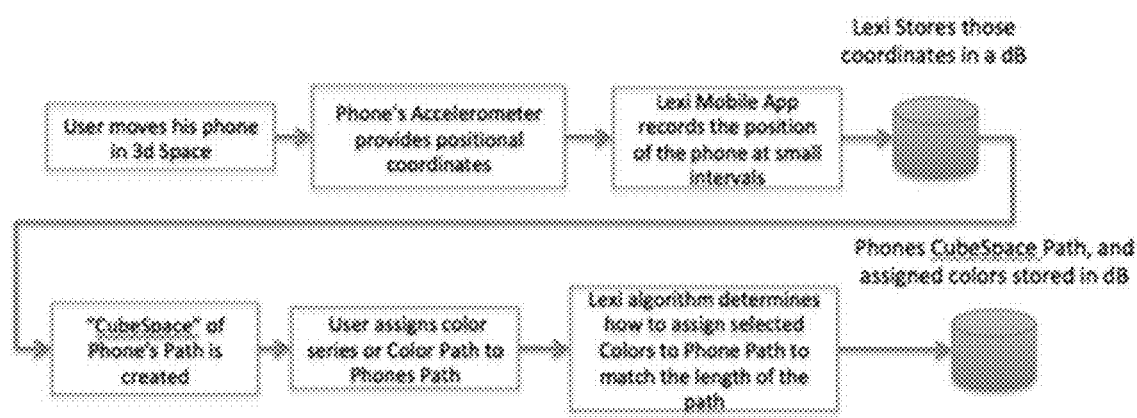
FIG. 11 is a drawing illustrating an example of a workflow for using a portable electronic device that includes an accelerometer to create a 3D pattern in cube space in accordance with an embodiment of the present disclosure.
Figure 12:
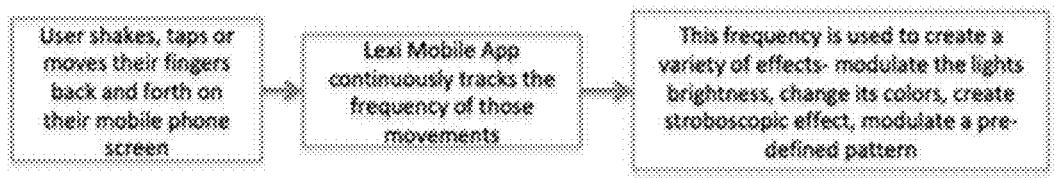
FIG. 12 is a drawing illustrating an example of a workflow for using a user interface with a touch-sensitive display to input or change a frequency of a scene, a pattern or a light show in accordance with an embodiment of the present disclosure.

In some embodiments, light art may be created or specified using gestures. For example, an accelerometer in electronic device 110-1 may be used to track a user's gestures and then track and trace this movement in 3D. Note that each trace may be stored in a data structure as a series of consecutive (x,y,z) coordinates. A user may then overlay a color pattern onto the traces to specify a so-called 'color path' and to complete the creation of the light art. FIG. 10 presents a drawing illustrating an example of the use of a portable electronic device to create a 3D pattern in cube space. Moreover, FIG. 11 presents a drawing illustrating an example of a workflow for using a portable electronic device that includes an accelerometer to create a 3D pattern in cube space Note that in a scene, a user may also use one or more techniques to manage or alter the rate of change of colors, brightness or a color temperature. For example, the user may shake electronic device 110-1, tap on touch-sensitive display or drag one or more fingers back and forth across the touch-sensitive display. The mobile app and/or the desktop app may track the frequency of these movements in real-time and may use this information to create a variety of effects, such as: modulating the lights brightness, changing colors, generating a stroboscopic effect, modulating a pre-defined pattern, etc. FIG. 12 presents a drawing illustrating an example of a workflow for using a user interface with a touch-sensitive display to input or change a frequency of a scene, a pattern or a light show.

Gesture Control with a Motion Capture Device

Figure 13:
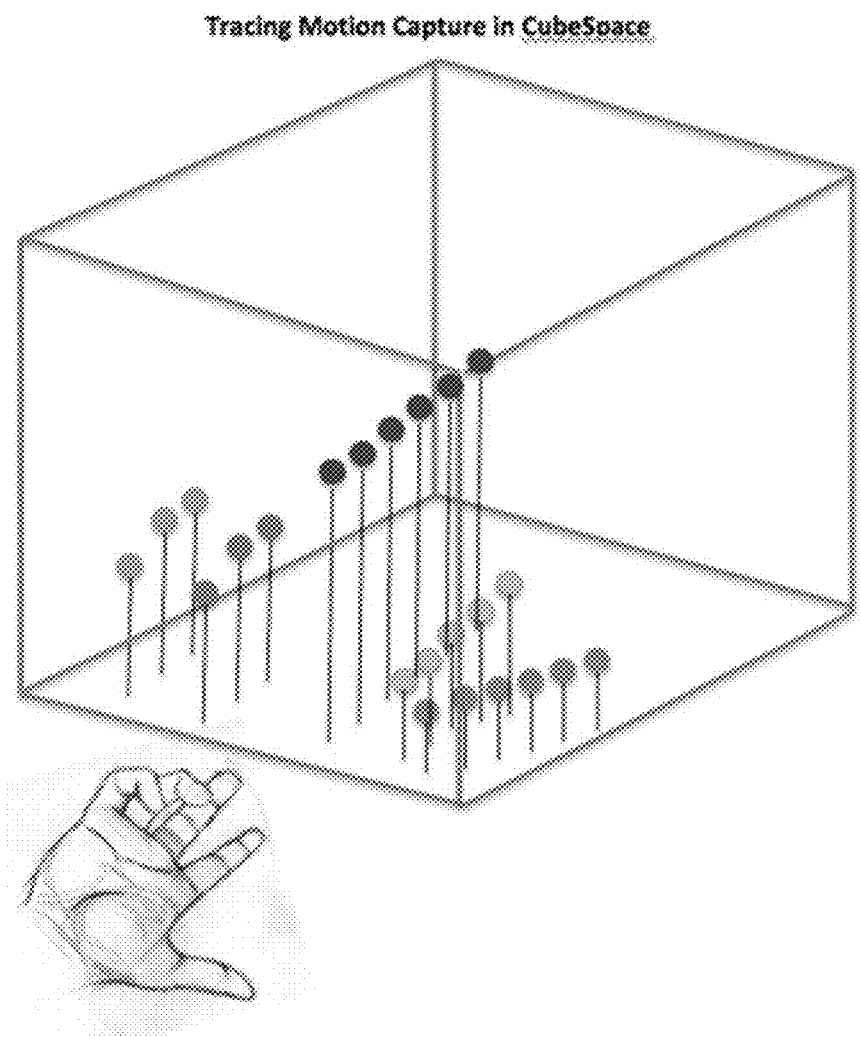
FIG. 13 is a drawing illustrating an example of the use of a motion capture device to create light patterns in 3D cube space in accordance with an embodiment of the present disclosure.

In some embodiments, lighting system 100 may be configured to work with a motion capture device. A motion capture device (such as a motion capture glove) may include multiple sensors that track the movement of the user's fingers in a 3D space. These movements may be translated into a continuous series of (x,y,z) coordinates that can be run as a real-time pattern in a 3D cube space or may be stored in a data structure for future playback. Note that the time series of (x,y,z) coordinates may define or specify a pattern in cube space which, as previously described, can be overlaid onto a user's 3D light configuration. Moreover, a user may assign an action to each unique motion capture element, such as an input associated with motion of a finger. An action may include: altering the frequency of a preselected color or color path, altering an actual color path or color series, and/or overlaying a new color onto an existing pattern running across lighting devices 122. FIG. 13 presents a drawing illustrating an example of the use of a motion capture device to create light patterns in 3D cube space.

Creating Designs

Figure 14:
FIG. 14 is a drawing illustrating an example of a workflow for creating designs in accordance with an embodiment of the present disclosure.

Note that a setting may be created in a variety of ways. For example, a user may use the mobile app and/or the desktop app to assign a specific light configuration to a groups, and/or to define types or categories of lighting devices 122. FIG. 14 presents a drawing illustrating an example of a workflow for creating designs.

Figure 15:
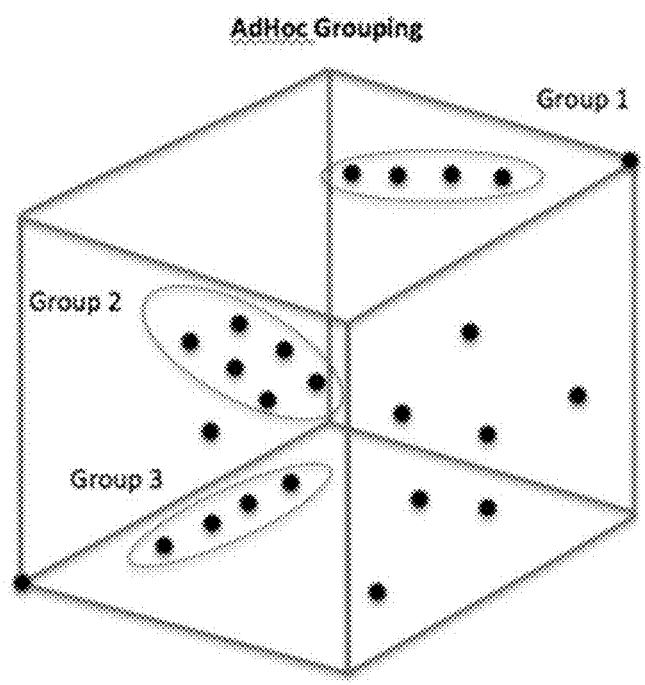
FIG. 15 is a drawing illustrating an example of a collection of ad hoc groupings in 3D cube space in accordance with an embodiment of the present disclosure.

Alternatively, a setting may be created using a cube space map of a user's lighting devices 122. For example, using a finger (on the mobile app) and/or a mouse (on the desktop app), a user may select lighting devices 122 in cube space to create an ad hoc grouping and then to specify a configuration for this group. The user can continue to select lighting devices 122 in cube space to create new ad hoc groups and to assign configurations to those groups until a desired setting is achieved. FIG. 15 presents a drawing illustrating an example of a collection of ad hoc groupings in 3D cube space Identification of Specific Types of Lighting Devices In order to identify each type of lighting device, a unique transistor may be included in the printed circuit board in each lighting device. A unique signature of this transistor may be mapped to a specific type of lighting device. This capability may identify the type of lighting device in each position in the 3D map. Given that each type of lighting device may have different characteristics, the output of each lighting device may be modulated in order to make the light output as consistent as possible (e.g., in terms of brightness, color temperature and/or color representation between different types of lighting devices).

Sharing

Users can share light art they have created by generating a link in the mobile app and then distributing this link via, e.g., email, text, messaging to other users. When a user that receives a link clicks on it or activates it, a light art creative file may be transferred to or associated with their account and they can begin using it on their lighting devices.

Marketplace

Lexi may provide a light art marketplace that is accessible from the mobile app, the desktop app and/or a web page or website associated with Lexi. Using the marketplace, users can buy and sell predefined scenes, patterns and/or light shows. Moreover, a user can list or post a predefined light art creation that they made using the mobile app, desktop app, and/or light-art creation software, or they may upload a light-art file made using another application.

Third Party Lights

Lighting system 100 may also work with lights or lighting devices provided or manufactured by a third party. In order to add these lighting devices to the mobile app, a user may click on or activate an add device option and then may selects add the third-party lighting devices. The mobile app may then scan the local network for all instances of these lighting devices and may show the user a list of available lighting devices. Once the user selects the lighting device to be added to lighting system 100, the mobile app may add the corresponding lighting-device information to lighting hub 120, and thereafter the functionality of these third-party lighting devices may be available via the mobile app and/or the desktop app. Thus, the third-party lighting devices may works as though they were provided by Lexi.

Hub, No Lighting Hub and Portable Hub Modes

Lighting system 100 may support different lighting-hub modes, including: lighting hub, no lighting hub, and/or a portable lighting hub.

In the portable lighting-hub mode, lighting hub 120 (and, thus, lighting system 100) may be completely portable. Because lighting hub 120 may be powered by USB, lighting hub 120 may be plugged into any USB adapter and it will start working. In the portable lighting-hub mode, lighting hub 120 may use a BLE mesh protocol. The mobile app may communicate with lighting hub 120 using a BLE mesh connection. A user can switch in/out of the portable lighting-hub mode using a single parameter in the settings.

In the no lighting-hub mode, lighting system 100 may offer very limited functionality. Notably, using Bluetooth, users can turn lighting devices 122 on/off, change brightness, change color temperature, change color and/or operate lighting devices 122 according to a schedule.

Light Show and Communication Overview

Lighting system 100 may provide a light show streaming up to 500 independent lighting devices 122, such as LEDs. Each of the LEDs may have their own color (e.g., RGB) control. When a 900 MHz communication protocol is used, lighting system 100 can provide up to 4M bps throughput.

Figure 16:
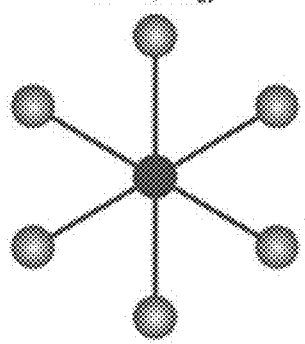
FIG. 16 is a drawing illustrating an example of a network topology in accordance with an embodiment of the present disclosure.

In some embodiments, wireless communication in lighting system 100 may use a star network topology. At the center of the star, there may be a gateway (such as lighting hub 120) to transmit a message using a communication protocol (such as a 900 MHz communication protocol). Note that the maximum transmission distance from the gateway to a node (such as one of lighting devices 122) may be 0.25 mile. FIG. 16 presents a drawing illustrating an example of a network topology.

Pairing Process for a 900 MHz Radio

During the pairing process, an application executing on lighting hub 120 may instruct lighting hub 120 to provide a binding message to a particular lighting device. For example, using Bluetooth, lighting hub 120 may provide one or more packets of frames with the information shown in Table 1. Note that a gateway number may be a number assigned by a manufacturer to a gateway (such as, e.g., 0-65535). Moreover, a lighting-device number may be a number assigned by the manufacturer to a lighting device (such as, e.g., 0-65535). Furthermore, CRC may be a checksum of the message. Once a lighting device has been successfully paired, it may indicate an assigned light number in lighting system 100, such as by flashing a red color five times for the number five.

TABLE 1

| 1 B | 1 B | 1 B | 2 B | 2 B | 1-4 B |
|---|---|---|---|---|---|
| 0xAA | 0x82 | 0x03 | Gateway number | Lighting-device number | CRC |

Secure and High-Resolution Communication

After setting up the network, light-show data may be communicated from lighting hub 120 to lighting devices 122. In order to provide a high-resolution light show, the framework of the light show may be communicated using one or more packets or fames having the format shown in Table 2. In this way, lighting hub 120 may control lighting devices 122.

TABLE 2

| 1 B | 1 B | 1 B | 2 B | 2 B | 1 B | 1 B | 1 B | 1 B | 1 B | 1 B |
|---|---|---|---|---|---|---|---|---|---|---|
| 0xAA | 0x91 | Length of gray data | Lighting-hub number | Lighting-device number | Red value | Green value | Blue value | Warm-white value | Cool-white value | CRC |

The one or more packets or frames can specify red, green, blue, warm white and/or cool white values from, e.g., 0-255. Consequently, high-resolution color can be specified using this packet or frame format. However, in order to support such a high-resolution packet of frame, a relatively high data rate may need to be supported. In other words, high-resolution image streaming may be limited in terms of the frame rate and the number of lighting devices that can be used.

Fast Streaming Communication

When managing a large number of lighting devices, lighting system 100 may uses a fast-streaming technique to reduce redundant data during wireless communication. For example, when streaming data from lighting hub 120 to a give lighting node, lighting system 100 may transmit or broadcast one or more packets or frames using a sequential technique, such that a packet or a frame can remove some headers and the payload format may be changed (as shown in Table 3). In some embodiments, this packet or frame format may specify light content using five bits, including a red bit, a green bit, a blue bit, a warm-white bit and a cool-white bit. The remaining three bits in this byte may be unavailable or unused. Consequently, a light show may be performed at low latency and may support a large number of lighting devices 122. However, because the RGB format may have been reduced to a single bit, the color in the light show may then be reduced to a limited number of combinations in a color space.

TABLE 3

| 1 B | 1 B | 1 B | 2 B | 1 B | 1 B | ... 1 B | 1 B | 1 B |
|---|---|---|---|---|---|---|---|---|
| 0xAA | 0x91 | Length of gray data | Lighting-hub number | Light content 1 | Light content 2 | ... Light content N-1 | Light content N | CRC |

Dynamic Lighting Design

In some embodiments, the mobile app and/or the desktop app may be used to dynamically create or generate a lighting design (such as settings, configurations, a number of lighting devices 122, locations of lighting devices 122 in an environment 124, a light show, etc.).

Notably, a user may upload one or more photographs or images of environment 124 (such as one or more different views or perspectives of a room) to computer 112. In response, computer 112 may use one or more image-processing techniques to analyze the one or more images to generate a digital representation of environment 124, such as 3D digital representation. For example, the image-processing technique may include: scale invariant feature transform (SIFT), speed-up robust features (SURF), a binary descriptor (such as ORB), binary robust invariant scalable keypoints (BRISK), fast retinal keypoint (FREAK), etc. In some embodiments, the image-processing technique may be implemented using a neural network and/or a machine-learning technique, such as a convolutional neural network.

Then, computer 112 may provide environment information that specifies the digital representation to electronic device 110-1 for display, e.g., in a user interface on a display.

Next, the user may provide input information that specifies a number of lighting devices 122 and/or one or more types of lighting devices 112 to electronic device 110-1. For example, the user may interact with the user interface on electronic device 110-1 to specify this input information, such as by using a keyboard, a mouse, using voice-recognition, and/or uploading a file. Electronic device 110-1 may provide this information to computer 112.

Based at least in part on the information, computer 112 may provide design information specifying one or more predefined lighting configurations (such as locations of lighting devices 122, brightness, colors, etc.) suitable for use in environment 124 to electronic device 110-1, which may display this design information in the user interface. For example, the user interface may display a set of links or icons to the one or more predefined lighting configurations. Note that the one or more predefined lighting configurations may be associated with one or more third parties, such as via the marketplace.

The user may dynamically select different options (such as different predefined lighting configurations) for consideration as the user attempts to design a lighting configuration for use in environment 124. A user selection may be provided by electronic device 110-1 to computer 112, which may generate a rendering of the selected predefined lighting configuration in environment 124. One or more images based on the rendering or information that specifies an augmented or virtual reality corresponding to the rendering may be provided by computer 112 to electronic device 110-1 for display in the user interface. The user may interact with the user interface to dynamically modify a given predefined lighting configuration to explore different design options. For example, the user may add or delete lighting devices, or may use drag-and-drop functionality to reposition one or more lighting devices 122. Thus, in some embodiments, the predefined lighting configuration may be used as a starting template in a design process. However, in other embodiments, the predefined lighting configuration may be fixed and the user may select to use it as is or to select a different predefined lighting configuration in the set of links or icons.

Alternatively, via the user interface, the user may design their own lighting configuration. The user's dynamically specified design may be provided by electronic device 110-1 to computer 112, which may generate or render one or more images or information that specifies an augmented or virtual reality corresponding to the rendering that are then provided back to electronic device 110-1 for display in the user interface.

In this way, the user may dynamically or iteratively determine a lighting configuration.

Once the lighting configuration is finalized, the user may indicate this, via the user interface to electronic device 110-1. In some embodiments, the user may purchase or rent (e.g., one-time or on an ongoing/renewable basis) a desired predefined lighting configuration. In response, electronic device 110-1 may provide lighting-configuration information to computer 112 and to lighting hub 120. Subsequently (such as in response to a user command, a schedule, etc.), lighting hub 120 may use the lighting-configuration information to provide a designed illumination in environment 124 using at least a subset of lighting devices 122. For example, based on the lighting-configuration information, lighting hub 120 may instruct lighting devices 122 to provide a specified spatial and/or temporal lighting pattern in environment 124.

While the preceding embodiments included particular operations, in other embodiments there may be fewer or more operations, different operations, a different ordering of the operations and/or two or more operations may be combined. Moreover, in some embodiments, one or more operations may be performed by different components. For example, the generating or rendering of one or more images or the information specifying an augmented or virtual reality corresponding to the rendering may be performed by electronic device 110-1 instead of or in conjunction with computer 112.

Electronic Devices

Figure 17:
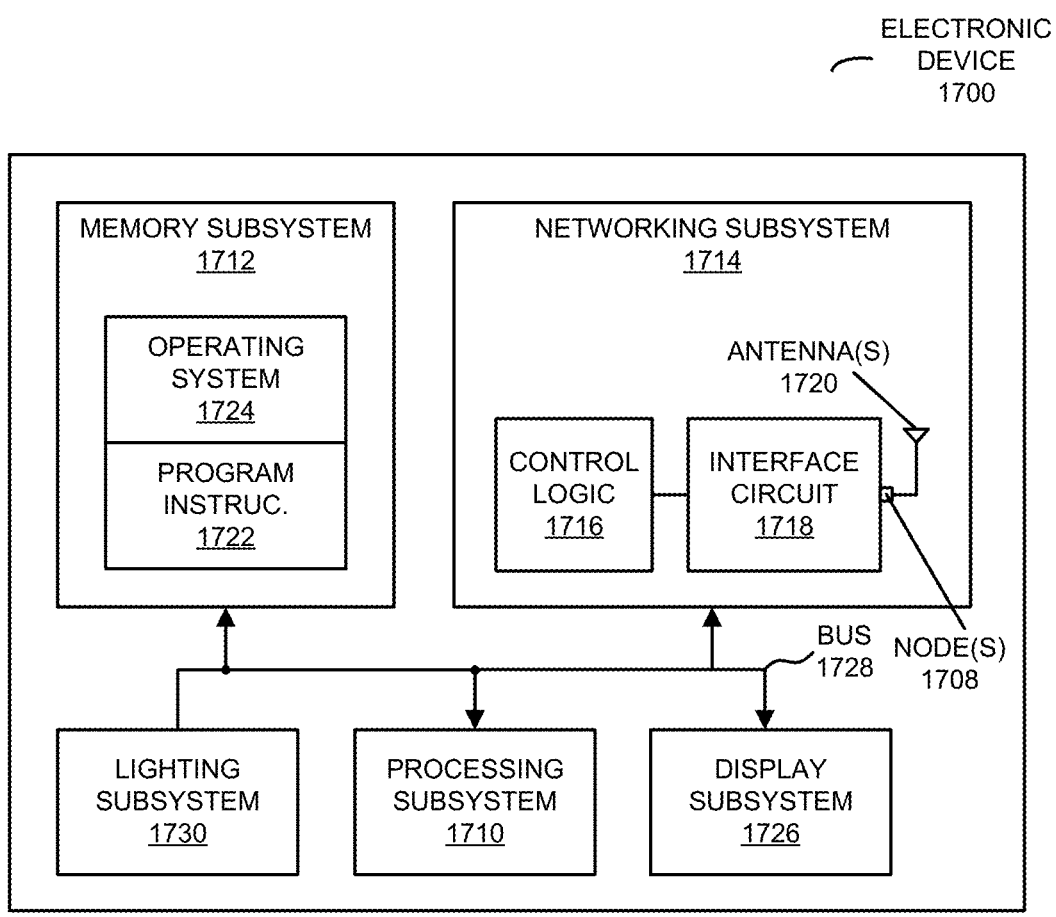
FIG. 17 is a block diagram illustrating an example of an electronic device in accordance with some embodiments.

We now describe embodiments of an electronic device, such as one of electronic devices 110, computer 112, lighting hub 120 or one of lighting devices 122. FIG. 17 presents a block diagram illustrating an example of an electronic device 1700 in accordance with some embodiments. This electronic device may include a processing subsystem 1710, a memory subsystem 1712, and a networking subsystem 1714. The processing subsystem 1710 may include one or more devices configured to perform computational operations. For example, the processing subsystem 1710 can include one or more microprocessors, ASICs, microcontrollers, programmable-logic devices, one or more graphics process units (GPUs) and/or one or more digital signal processors (DSPs).

The memory subsystem 1712 may include one or more devices for storing data and/or instructions for the processing subsystem 1710 and the networking subsystem 1714. For example, the memory subsystem 1712 can include dynamic random access memory (DRAM), static random access memory (SRAM), and/or other types of memory. In some embodiments, instructions for the processing subsystem 1710 in the memory subsystem 1712 include: one or more program modules or sets of instructions (such as program instructions 1722 or an operating system 1724), which may be executed by the processing subsystem 1710. Note that the one or more computer programs may constitute a computer-program mechanism. Moreover, instructions in the various modules in the memory subsystem 1712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by the processing subsystem 1710.

In addition, the memory subsystem 1712 can include mechanisms for controlling access to the memory. In some embodiments, the memory subsystem 1712 includes a memory hierarchy that comprises one or more caches coupled to a memory in the electronic device 1700. In some of these embodiments, one or more of the caches is located in the processing subsystem 1710.

In some embodiments, the memory subsystem 1712 is coupled to one or more high-capacity mass-storage devices (not shown). For example, the memory subsystem 1712 can be coupled to a magnetic or optical drive, a solid-state drive, or another type of mass-storage device. In these embodiments, the memory subsystem 1712 can be used by the electronic device 1700 as fast-access storage for often-used data, while the mass-storage device is used to store less frequently used data.

The networking subsystem 1714 may include one or more devices configured to couple to and communicate on a wired and/or wireless network (i.e., to perform network operations), including: a control logic 1716, an interface circuit 1718 and one or more antennas 1720 (or antenna elements). (While FIG. 17 includes the one or more antennas 1720, in some embodiments the electronic device 1700 includes one or more nodes, such as a nodes 1708, e.g., a network node that can be connected or coupled to a network, or a pad that can be coupled to the one or more antennas 1720. Thus, the electronic device 1700 may or may not include the one or more antennas 1720.) For example, the networking subsystem 1714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

The networking subsystem 1714 may include processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, the electronic device 1700 may use the mechanisms in the networking subsystem 1714 for performing simple wireless communication between the electronic devices, e.g., transmitting advertising or beacon frames and/or scanning for advertising frames transmitted by other electronic devices as described previously.

Within the electronic device 1700, the processing subsystem 1710, the memory subsystem 1712, and the networking subsystem 1714 are coupled together using a bus 1728. The bus 1728 may include an electrical, optical, and/or electro-optical connection that the subsystems can use to communicate commands and data among one another. Although only one bus 1728 is shown for clarity, different embodiments can include a different number or configuration of electrical, optical, and/or electro-optical connections among the subsystems.

In some embodiments, the electronic device 1700 includes a display subsystem 1726 for displaying information on a display, which may include a display driver and the display, such as a liquid-crystal display, a multi-touch touchscreen, etc.

The electronic device 1700 can be (or can be included in) any electronic device with at least one network interface. For example, the electronic device 1700 can be (or can be included in): a desktop computer, a laptop computer, a subnotebook/netbook, a server, a tablet computer, a smartphone, a cellular telephone, a smartwatch, a consumer-electronic device, a portable computing device, a controller, test equipment, and/or another electronic device.

Although specific components are used to describe the electronic device 1700, in alternative embodiments, different components and/or subsystems may be present in the electronic device 1700. For example, the electronic device 1700 may include one or more additional processing subsystems, memory subsystems, networking subsystems, and/or display subsystems. Additionally, one or more of the subsystems may not be present in the electronic device 1700. Moreover, in some embodiments, the electronic device 1700 may include one or more additional subsystems, such as light subsystem 1730 with one or more lighting devices or lighting sources, or one or more subsystems that are not shown in FIG. 17. Also, although separate subsystems are shown in FIG. 17, in some embodiments some or all of a given subsystem or component can be integrated into one or more of the other subsystems or component(s) in the electronic device 1700. For example, in some embodiments the program instructions 1722 are included in the operating system 1724 and/or the control logic 1716 is included in the interface circuit 1718. In some embodiments, the lighting technique is implemented using information in layer 2 and/or layer 3 of the Open System Interconnection model.

Moreover, the circuits and components in the electronic device 1700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of the networking subsystem 1714 (or, more generally, of the electronic device 1700). The integrated circuit may include hardware and/or software mechanisms that are used for transmitting wireless signals from the electronic device 1700 and receiving signals at the electronic device 1700 from other electronic devices. Aside from the mechanisms herein described, radios are generally known in the art and hence are not described in detail. In general, the networking subsystem 1714 and/or the integrated circuit can include any number of radios. Note that the radios in multiple-radio embodiments function in a similar way to the described single-radio embodiments.

In some embodiments, the networking subsystem 1714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

The electronic device 1700 may be used with a wide variety of communication protocols and, more generally, wired and/or wireless communication techniques. Thus, the described lighting technique may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the lighting technique may be implemented using the program instructions 1722, the operating system 1724 (such as a driver for the interface circuit 1718) or in firmware in the interface circuit 1718. Alternatively or additionally, at least some of the operations in the lighting technique may be implemented in a physical layer, such as hardware in the interface circuit 1718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the lighting technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a network node; and
   an interface circuit, coupled to the network node, configured to communicate with a second electronic device;
   memory configured to store program instructions;
   a processor, coupled to the memory, configured to execute the program instructions, wherein, when executed by the processor, the program instructions cause the electronic device to perform operations comprising:
      receiving an image of an environment comprising a room associated with a user, wherein the image is associated with an image sensor and provides a physical perspective of the environment, and wherein the program instructions allow a lighting design to be designed for the environment;
      providing, from the network node, the image addressed to the second electronic device;
      receiving, at the network node, one or more packets or frames associated with the second electronic device, wherein the one or more packets or frames convey a digital representation of the environment corresponding to the image;
      receiving input information that specifies a number of lighting devices, types of lighting devices or both;
      providing, from the network node, the input information addressed to the second electronic device;
      receiving, at the network node, one or more second packets or frames associated with the second electronic device, wherein the one or more second packets or frames convey design information specifying one or more predefined lighting configurations suitable for use in the environment and that are compatible with the input information;
      presenting the design information specifying the one or more predefined lighting configurations;
      receiving a user selection of a given predefined lighting configuration in the one or more predefined lighting configurations; and
      in response to the user selection, presenting the one or more second images having associated perspectives that illustrate the given predefined lighting configuration in a context of the digital representation, wherein the one or more second images comprise augmented or virtual reality with the perspectives on lighting devices, associated with the given predefined lighting configuration, in the digital representation of the environment.

2. The electronic device of claim 1, wherein a given lighting device comprises one or more light sources.

3. The electronic device of claim 1, wherein the operations comprise:
   dynamically receiving a sequence of user modifications to the given predefined lighting configuration; and
   iteratively presenting one or more modified second images having associated perspectives that illustrate the given predefined lighting configuration in a context of the digital representation, wherein the one or more modified second images incorporate the sequence of user modifications.

4. The electronic device of claim 1, wherein the operations comprise:
   receiving user approval of the given predefined lighting configuration; and
   providing, from the network node, design information corresponding the given predefined lighting configuration addressed to a lighting hub in a lighting system that includes the number of lighting devices.

5. The electronic device of claim 1, wherein the given predefined lighting configuration comprises one or more of: locations of lighting devices in the environment, one or more colors of the lighting devices selected from a color space, one or more color temperatures of the lighting devices, one or more brightness levels of the lighting devices, a spatial illumination pattern of the lighting devices, or a temporal illumination pattern of the lighting devices.

6. The electronic device of claim 1, wherein the operations comprise generating the one or more second images based at least in part on the given predefined lighting configuration and the input information.

7. The electronic device of claim 6, wherein the generating comprises:
   providing, from the network node, the user selection addressed to the second electronic device; and
   receiving, at the network node, the one or more second images associated with the second electronic device.

8. The electronic device of claim 1, wherein the operations comprise:
   dynamically receiving a sequence of user design selections that specify a lighting configuration; and
   iteratively presenting one or more third images having associated perspectives that illustrate the lighting configuration in a context of the digital representation, wherein the one or more third images incorporate the user design selections.

9. The electronic device of claim 1, wherein the lighting configuration comprises one or more of: locations of lighting devices in the environment, one or more colors of the lighting devices selected from a color space, one or more color temperatures of the lighting devices, one or more brightness levels of the lighting devices, a spatial illumination pattern of the lighting devices, or a temporal illumination pattern of the lighting devices.

10. The electronic device of claim 1, wherein the predefined lighting configurations are associated with one or more third parties that are different from a user or an entity associated with the second electronic device.

11. A non-transitory computer-readable storage medium for use in conjunction with an electronic device, the computer-readable storage medium storing program instructions that, when executed by a processor in the electronic device, causes the electronic device to perform operations comprising:
receiving an image of an environment comprising a room associated with a user, wherein the image is associated with an image sensor and provides a physical perspective of the environment, and wherein the program instructions allow a lighting design to be designed for the environment;
providing the image addressed to a second electronic device;
receiving one or more packets or frames associated with the second electronic device, wherein the one or more packets or frames convey a digital representation of the environment corresponding to the image;
receiving input information that specifies a number of lighting devices, types of lighting devices or both;
providing the input information addressed to the second electronic device;
receiving, at the network node, one or more second packets or frames associated with the second electronic device, wherein the one or more second packets or frames convey design information specifying one or more predefined lighting configurations suitable for use in the environment and that are compatible with the input information;
presenting the design information specifying the one or more predefined lighting configurations;
receiving a user selection of a given predefined lighting configuration in the one or more predefined lighting configurations; and
in response to the user selection, presenting the one or more second images having associated perspectives that illustrate the given predefined lighting configuration in a context of the digital representation, wherein the one or more second images comprise augmented or virtual reality with the perspectives on lighting devices, associated with the given predefined lighting configuration, in the environment, in the digital representation of the environment.

12. The non-transitory computer-readable storage medium of claim 11, wherein a given lighting device comprises one or more light sources.

13. The non-transitory computer-readable storage medium of claim 11, wherein the operations comprise:
dynamically receiving a sequence of user modifications to the given predefined lighting configuration; and
iteratively presenting one or more modified second images having associated perspectives that illustrate the given predefined lighting configuration in a context of the digital representation, wherein the one or more modified second images incorporate the sequence of user modifications.

14. The non-transitory computer-readable storage medium of claim 11, wherein the operations comprise:
receiving user approval of the given predefined lighting configuration; and
providing, from the network node, design information corresponding the given predefined lighting configuration addressed to a lighting hub in a lighting system that includes the number of lighting devices.

15. The non-transitory computer-readable storage medium of claim 11, wherein the given predefined lighting configuration comprises one or more of: locations of lighting devices in the environment, one or more colors of the lighting devices selected from a color space, one or more color temperatures of the lighting devices, one or more brightness levels of the lighting devices, a spatial illumination pattern of the lighting devices, or a temporal illumination pattern of the lighting devices.

16. The non-transitory computer-readable storage medium of claim 11, wherein the operations comprise generating the one or more second images based at least in part on the given predefined lighting configuration and the input information.

17. The non-transitory computer-readable storage medium of claim 16, wherein the generating comprises:
providing the user selection addressed to the second electronic device; and
receiving the one or more second images associated with the second electronic device.

18. The non-transitory computer-readable storage medium of claim 11, wherein the operations comprise:
dynamically receiving a sequence of user design selections that specify a lighting configuration; and
iteratively presenting one or more third images having associated perspectives that illustrate the lighting configuration in a context of the digital representation, wherein the one or more third images incorporate the user design selections.

19. The non-transitory computer-readable storage medium of claim 11, wherein the lighting configuration comprises one or more of: locations of lighting devices in the environment, one or more colors of the lighting devices selected from a color space, one or more color temperatures of the lighting devices, one or more brightness levels of the lighting devices, a spatial illumination pattern of the lighting devices, or a temporal illumination pattern of the lighting devices.

20. A method for presenting one or more second images, comprising:
by a processor in an electronic device:
receiving an image of an environment comprising a room associated with a user, wherein the image is associated with an image sensor and provides a physical perspective of the environment, and wherein the program instructions allow a lighting design to be designed for the environment;
providing the image addressed to a second electronic device;
receiving one or more packets or frames associated with the second electronic device, wherein the one or more packets or frames convey a digital representation of the environment corresponding to the image;
receiving input information that specifies a number of lighting devices, types of lighting devices or both;
providing the input information addressed to the second electronic device;
receiving, at the network node, one or more second packets or frames associated with the second electronic device, wherein the one or more second packets or frames convey design information specifying one or more predefined lighting configurations suitable for use in the environment and that are compatible with the input information;

presenting the design information specifying the one or more predefined lighting configurations;

receiving a user selection of a given predefined lighting configuration in the one or more predefined lighting configurations; and in response to the user selection, presenting the one or more second images having associated perspectives that illustrate the given predefined lighting configuration in a context of the digital representation, wherein the one or more second images comprise augmented or virtual reality with the perspectives on lighting devices, associated with the given predefined lighting configuration, in the environment, in the digital representation of the environment.

* * * * *